Nov. 29, 1938.  E. H. BURGIN  2,138,595
RADIO RANGE BEAM PROJECTOR
Filed June 12, 1937
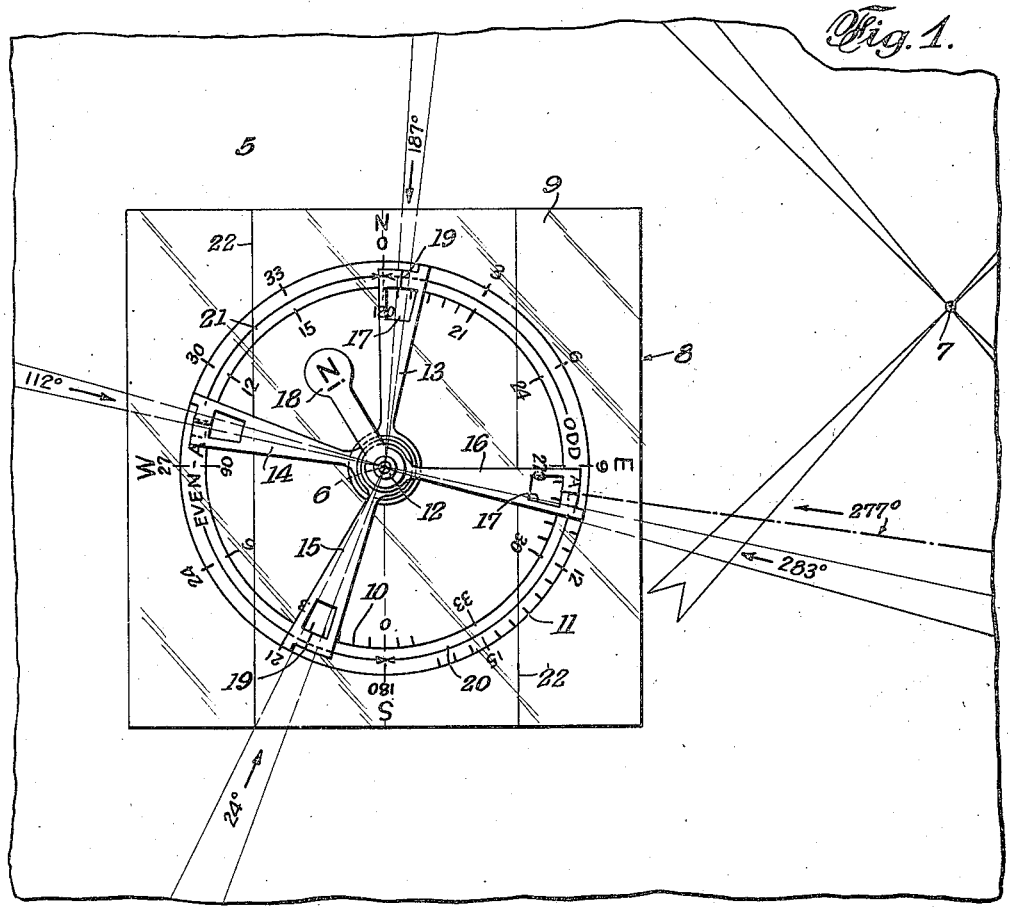
INVENTOR
EMILE H. BURGIN
ATTORNEY Patented Nov. 29, 1938

2,138,595

UNITED STATES PATENT OFFICE 2,138,595

RADIO RANGE BEAM PROJECTOR

Emile H. Burgin, Elizabeth, N. J.

Application June 12, 1937, Serial No. 147,856

4 Claims. (Cl. 33—1)

This invention relates to radio range beam projectors and more particularly to an instrument by means of which an airplane or airship pilot may orient his position and line of flight with all available data such as maps and the like.

Radio beams are provided to guide the pilot on his course, and those flying commercial airways are instructed to follow these beams either to or from a given point of the flight.

So that the pilot may have knowledge of the direction of the beams which he is flying, the Coast and Geodetic Survey of the Department of Commerce provides maps upon which the beams are shown, and upon these beams are indicated their magnetic bearings towards their transmitters. Since each transmitter has its own identification signal and its own frequency, a pilot is safely guided in his flight thereby, and by consulting a map covering the terrain over which he is flying, determine, quite accurately, his position, his line of flight, and the elevation at which he must fly to safely avoid hills and other dangerous flying hazards.

The beams, however, are frequently directionally changed in order to avoid bad terrain or to coordinate them with beams from other points and since the mentioned maps are a long while in preparation, they are not available in revised form at all times. A pilot, therefore, frequently finds himself flying a beam which has been directionally changed several degrees from that shown on the map. It can be well understood, especially with poor ceiling conditions, that he may find himself considerably off his course and over hills and hazards not contemplated in his line of flight.

More frequently, however, the Hydrographic Office of the Navy Department provides a booklet entitled "Notice to Aviators" in which the revised bearings towards the beam transmitters are listed. The Aeronautics Branch of the Department of Commerce also provides this revised data. But no convenient means are available to guide the pilot in revising the bearings of the beams which appear on his maps.

The present invention, therefore, contemplates the provision of an instrument whereby the bearing of a beam may be projected upon a map in accordance with the bearing as listed in the mentioned booklet or from other current data.

Since each transmitter sends out four beams, the invention contemplates the provision of a device whereby all of said beams may be reoriented upon a map or the like and whereby the four quadrants between the beams may be accurately defined and designated.

With the above general objects and others later apparent, in mind, the invention contemplates the simple, inexpensive device as illustrated in its preferred embodiment in the accompanying drawing and as described in the following specification:

In the drawing:

Fig. 1 is a plan view of the contemplated device as applied and used on a map showing radio beams.

Fig. 2 is an edge view of the device.

Fig. 3 is a view showing a fragment of any data having the beam bearings.

In greater detail, a fragment of a map is shown at 5, and upon this map, for example, are indicated two transmitters respectively 6 and 7. As shown on the map, the south beam of the transmitter 6, deviates 24° from north in the direction towards the transmitter; the west beam, 112°; the north beam, 187°; and the east beam, 283°.

Arbitrarily assuming that the point 6 is called "Big City", that locality is found in the mentioned booklet or other available data. As shown in Figure 3, the south, west, and north beams of that transmitter agree with the markings on the map; but the east beam has been changed from 283° to 277°. It is desirable, therefore, to mark the map with a line or lines representing the new bearing of the east beam. For this purpose the device 8 is employed.

The device comprises a transparent sheet or back 9 having concentrically arranged degree graduations 10 and 11, each starting at zero at diametrically opposite points. The inner graduations 10 are read for bearings towards the transmitter and the outer graduations are read for bearings away from the transmitter. In addition, the cardinal points N, E, S, and W are marked on the sheet with the point N at the zero marking of the outer graduations.

On a central pivot post 12 are mounted the arms 13, 14, 15, and 16 in superposed relation. The arms are mounted to be freely moved, yet enough friction is afforded by proper construction of the post to cause any arm when positioned, to remain so positioned until moved intentionally. Hence, in use, the lowermost arm is positioned first, then the others successively.

In order to give visual access to the scale 10, each of the arms is preferably formed with windows or openings, or the like 17.

In addition to the mentioned arms, the post is also provided with a sector or quadrant arm 18 superimposed on the uppermost arm 16.

In use, the device is placed with its center on the transmitter as indicated on the map, and the arms 13 to 16 from the bottom up are placed so their index marks 19 may be read on the scale 10 in accordance with the data as, for instance, shown in Figure 3. If the arms coincide with the beams shown, no revision on the map is necessary; but, as indicated in Figure 1, should a beam marking differ with the position of the relating arm, the instrument affords an accurate guide for projecting, on the map, the new position of said beam. Thus the map may be quickly revised so the pilot may have a true and accurate visible picture of the radio range station that he is approaching.

The sector arm which may bear the legend N or A is positioned in that quadrant to which it relates as a further guide to the pilot.

The flying regulations require that a pilot flying towards a transmitter on any of the bearings between 180° and 360°, but not including 180°, fly at even altitudes, i. e., 2000 feet, 4000 feet, 6000 feet, etc.; and those flying any of the bearings between 360° and 180°, but not including 360°, fly at odd altitudes, i. e., 1000 feet, 3000 feet, 5000 feet, etc. In order to guide a pilot in ascertaining at which altitudes he must fly, the device is provided with the arrow markings 20 and 21, respectively marked Even Alt. and Odd Alt.

In order to guide the positioning of the device upon a map, the sheet may be formed with the lateral edges as shown so that these edges may be related to any longitude line on the map. Also, the sheet may be provided with a plurality of lines 22 so a more accurate relation with a longitude line may be had. In this manner assurance is had that the cardinal points of the device will fall on the cardinal points of the map.

From the foregoing it can be seen that a pilot, with the aid of a device as herein contemplated, may, either before taking off or during flight, quickly and accurately project upon a map the true bearing of a radio range beam; determine his position in any one of the N or A quadrants; and know at which of the regulated altitudes he is to fly.

While the device is quite simple in construction, it is apparent that immaterial changes therein may be made without departing from the true spirit and scope of the invention as claimed.

I claim:

1. The combination with a map showing radio beams thereon, of a radio range beam projector comprising a transparent sheet member having concentric scales in degrees, said scales being 180° out of phase with each other, a plurality of four arms pivoted on a common center, each adapted to be positioned on selected degree markings along the bearings of the beams on the map and along corrected bearings of said beams as published from time to time, and a sector designating arm adapted to be positioned in a selected quadrant between two adjacent arms.

2. A device of the character described comprising a transparent sheet, and a plurality of arms each representing a radio beam pivotally mounted on said sheet, the arm contiguous with the sheet affording frictional engagement with said sheet, and each of the other arms, from the sheet outwardly, affording decreasingly lesser frictional engagement with each other.

3. A device of the character described, comprising a transparent sheet member having a central point and provided with concentric scales in degrees, said scales being 180° out of phase with each other, and a plurality of arms pivotally mounted at said point and each having an index mark, said arms being each adapted to be positioned with its index mark on a selected degree marking, the arm contiguous with the sheet member affording frictional engagement with said sheet, and each of the other arms, from the sheet outwardly, affording decreasingly lesser frictional engagement with each other.

4. The combination with a map showing radio beams thereon, of a radio range beam projector comprising a transparent sheet member having concentric scales in degrees, said scales being 180° out of phase with each other, four arms each adapted to be positioned on selected degree markings along the bearings of the beams on the map and along corrected bearings of said beams as published from time to time and a sector designating arm adapted to be positioned in a selected quadrant between two adjacent arms, said four arms pivotally mounted one above the other on a common center, the arm contiguous with the sheet member affording frictional engagement with said sheet, and each of the other arms, from the sheet outwardly, affording decreasingly lesser frictional engagement with each other.

EMILE H. BURGIN.